(12) United States Patent
Lee et al.

(10) Patent No.: US 7,616,547 B2
(45) Date of Patent: Nov. 10, 2009

(54) HIGH-SPEED MIXED ANALOG/DIGITAL PRML DATA DETECTION AND CLOCK RECOVERY APPARATUS AND METHOD FOR DATA STORAGE

(75) Inventors: Jeong-won Lee, Sungnam-si (KR); Jung-hyun Lee, Seoul (KR); Jae-wook Lee, Osan-si (KR); Jung-eun Lee, Sungnam-si (KR); Konakov Maxim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 547 days.

(21) Appl. No.: 11/059,458

(22) Filed: Feb. 16, 2005

(65) Prior Publication Data

US 2005/0180287 A1    Aug. 18, 2005

(30) Foreign Application Priority Data

Feb. 16, 2004    (KR) .................. 10-2004-0010163

(51) Int. Cl.
*H04B 3/06* (2006.01)
*G11B 20/10* (2006.01)
*G11B 20/14* (2006.01)
*G11B 20/18* (2006.01)
*G11B 5/09* (2006.01)

(52) U.S. Cl. ............... 369/59.21; 369/59.22; 369/59.15

(58) Field of Classification Search ............... 369/59.22
See application file for complete search history.

(56) References Cited

U.S. PATENT DOCUMENTS 5,986,831 A * 11/1999 Muto .......................... 360/46

| | | | |
|---|---|---|---|
| 6,191,906 B1 * | 2/2001 | Buch | 360/51 |
| 7,068,584 B2 * | 6/2006 | Mouri et al. | 369/124.1 |
| 2004/0114912 A1 * | 6/2004 | Okamoto et al. | 386/114 |
| 2005/0141378 A1 * | 6/2005 | Tatsuzawa et al. | 369/53.2 |

FOREIGN PATENT DOCUMENTS

| JP | 2000-100083 | 4/2000 |
|---|---|---|
| JP | 2000-113597 | 4/2000 |
| JP | 2000-149459 | 5/2000 |
| JP | 2000-331429 | 11/2000 |
| JP | 2001-126395 | 5/2001 |
| JP | 2001-189053 | 7/2001 |
| JP | 2002-319137 | 10/2002 |
| JP | 2002-352512 | 12/2002 |
| JP | 2003-036612 | 2/2003 |
| JP | 2003-059187 | 2/2003 |
| JP | 2003-272166 | 9/2003 |

* cited by examiner

*Primary Examiner*—Wayne R Young
*Assistant Examiner*—Dionne H Pendleton
(74) *Attorney, Agent, or Firm*—Staas & Halsey LLP

(57) ABSTRACT

A high-speed mixed analog/digital PRML data detection and clock recovery apparatus and method. The high-speed mixed analog/digital PRML data detection and clock recovery apparatus includes a variable gain amplifier, an analog equalizer, an analog-to-digital (A/D) converter, a DC offset remover, a level error detector, a Viterbi decoder, and an adaptive digital controller. The adaptive digital controller separately stores the level error values by predetermined frequencies, calculates predetermined coefficient values by each frequency component based on the level error values, and D/A-converts and applies the calculated predetermined coefficient values to the variable gain amplifier and the analog equalizer.

22 Claims, 12 Drawing Sheets x : y = b : (a+b)
PR(a,b,b,a)

$\varepsilon_i = |u_i| - |x_i| = u_i - x_i = (u_i - x_i) \cdot sign(x_i)$ $\varepsilon_i = -(|u_i| + |x_i|) = -(u_i + (-x_i)) = -u_i + x_i = (u_i - x_i) \cdot sign(x_i)$ $\varepsilon_i = |u_i| - |x_i| = (-u_i) - (-x_i) = -(u_i - x_i) = (u_i - x_i) \cdot sign(x_i)$ $\varepsilon_i = -(|u_i| + |x_i|) = -((-u_i) + x_i) = u_i - x_i = (u_i - x_i) \, sign(x_i)$

HIGH-SPEED MIXED ANALOG/DIGITAL PRML DATA DETECTION AND CLOCK RECOVERY APPARATUS AND METHOD FOR DATA STORAGE

CROSS-REFERENCE TO RELATED APPLICATIONS

This application claims benefit under 35 U.S.C. § 119 from Korean Patent Application No. 2004-10163 filed on Feb. 16, 2004 with the Korean Intellectual Property Office, the entire content of which is incorporated herein by reference.

BACKGROUND OF THE INVENTION

1. Field of the Invention

Embodiments of the present invention relate generally to a partial response maximum likelihood (PRML) data detection and clock recovery apparatus and method. More particularly, the present invention relates to a high-speed mixed digital/analog PRML data detection and clock recovery apparatus and method for data storage requiring less area, results in reduced power consumption, and has an improved operation speed.

2. Description of the Related Art

PRML signal processing is a signal processing technique for a computer hard disc, or an optical disc read channel, which have been widely employed in recent years due to their high storage density and transfer rates. The PRML-related technologies have also advanced, with many implementations for the same being proposed.

FIG. 1 is a block diagram of a reproducing and/or recording apparatus, e.g., a general optical disc system. In FIG. 1, the exemplary optical disc system includes a pickup 20 for reading in data recorded in an optical disc 10, such as a digital versatile disk (DVD) or a compact disc (CD), or the like, an RF block 30 for generating an RF signal from a signal read in by the pickup 20, a data processing (DP) block 90 for processing the RF signal output from the RF block 30, and a PRML block 80 for improving and transferring to the DP block 90 a bit error rate (BER) of the RF signal output from the RF block 30. With this arrangement, the reproducing and/or recording apparatus can implement reading from and recording to a medium, e.g., the optical disc system reading from and recording to an optical disc.

FIG. 2 is a block diagram of a conventional PRML block. In FIG. 2, the conventional PRML block includes an analog amplification and equalization part 50, an A/D converter 52, a DC offset remover 54, a clock recovery circuit 70, an adaptive digital equalizer 56, a level error detector 58, and a Viterbi decoder 60.

The analog amplification and equalization part 50 has plural D/A converters 41 and 42, a variable gain amplifier 44, an analog equalizer 46, and an analog gain control (AGC) controller 48.

The variable gain amplifier (VGA) 44 amplifies an input RF signal, and the AGC controller 48 maintains the level of a signal output from the analog equalizer 46 constant. The analog equalizer 46 uses a low-pass filter to equalize the RF signal amplified by the variable gain amplifier 44.

The bandwidth and boosting gain of the low-pass filter are adjusted depending on fixed parameters. A signal equalized and output by the analog equalizer 46 goes through sampling by the A/D converter 52, and is converted into a digital RF signal. The DC offset remover 54 receives the sampled digital RF signal, and removes a DC offset component from the same. A signal output from the DC offset remover 54 is input to the clock recovery circuit 70 and the adaptive digital equalizer 56.

The clock recovery circuit 70 has a frequency and phase error detector 72, a digital loop filter 74, a third D/A converter 76, and a voltage-controlled oscillator 78.

The adaptive digital equalizer 56 uses a FIR filter to equalize, in a desired form, a digital RF signal from which the DC offset component has been removed. Such an equalized digital RF signal is input to the Viterbi decoder 60 and the level error detector 58.

The level error detector 58 calculates an error signal based on a difference between the level of a desired channel and the level of a digital RF signal actually input from the adaptive digital equalizer 56, and applies the calculated error signal to the Viterbi decoder 60 and the adaptive digital equalizer 56. The Viterbi decoder 60 decodes an equalized signal from the adaptive digital equalizer 56 to recover data, and delivers the data to the DP block 90.

The conventional PRML data detection apparatus operates at the maximum speed of 420 MHz, also as a typical operation speed, and uses an FIR filter inside the adaptive digital equalizer 56 to equalize the RF signal. However, such a FIR filter is provided with a series of adders and multipliers, which in itself causes problems, since a resultant chip area cannot be small in size and the operation speed is limited.

Again, the digital loop filter 74 of the clock recovery circuit 70 uses plural adders and multipliers, as in the adaptive digital equalizer 56, which also causes problems, since the chip area is prevented from becoming small in size and the operation speed is very limited.

It has become important to reduce power consumption as battery-operated notebook computers have become widely used, but as noted above the conventional PRML data detection apparatus is prevented from reducing the corresponding power consumption.

SUMMARY OF THE INVENTION

Embodiments of the present invention have been developed to solve the above drawbacks and other problems associated with conventional arrangements. An aspect of the present invention is to provide a high-speed mixed analog/digital PRML data detection and clock recovery apparatus and method capable of reducing a chip area, improving an operational speed of a system, and reducing power consumption, in place of the digital FIR filters and digital loop filters of the conventional PRML data detection apparatuses and methods.

Another aspect of the present invention is to provide a high-speed mixed analog/digital PRML data detection and clock recovery apparatus and method for data storage for equalizing actual channel data to a desired target channel model by controlling gains of a variable gain amplifier and an analog equalizer.

Additional aspects and/or advantages of the invention will be set forth in part in the description which follows and, in part, will be obvious from the description, or may be learned by practice of the invention.

To achieve the above and/or other aspects and advantages, embodiments of the present invention include a high-speed mixed analog/digital PRML data detection and clock recovery apparatus, including a variable gain amplifier for amplifying a gain of an input analog RF signal, an analog equalizer for equalizing the amplified analog RF signal, an analog-to-digital (A/D) converter for sampling and converting into a digital RF signal the equalized analog RF signal, a DC offset remover for removing DC offset components out of the digital RF signal and outputting a DC offset removal signal, a level error detector for detecting from the DC offset removal signal a determination level of the DC offset removal signal to have any one value of reference levels required by a desired channel characteristics model, and calculating level error values being a difference between the determination level and an actual level of the DC offset removal signal, a Viterbi decoder for decoding the DC offset removal signal and recovering data, and an adaptive digital controller for separately storing the level error values according to predetermined frequencies, calculating predetermined coefficient values for each frequency component based on the level error values, and D/A-converting and applying the calculated predetermined coefficient values to the variable gain amplifier and the analog equalizer for the respective amplifying and equalizing.

The frequency component of the predetermined coefficient values applied to the variable gain amplifier may be a low-frequency, or the frequency component of the predetermined coefficient values applied to the analog equalizer may be a high-frequency.

The adaptive digital controller may further include a frequency detector for inputting a determination signal of the level error detector, from which the determination level is detected to have the one value of the reference levels, comparing a frequency of the determination signal to a predetermined threshold frequency, and calculating frequency components of the determination signal, a scheduler for storing the level error values in a first accumulator when the frequency components of the determination signal are high frequencies, and storing the level error values in a second accumulator when the frequency components of the determination signal are low frequencies, based on information on the calculated frequency components of the determination signal, and a coefficient calculator for calculating a first coefficient for controlling a gain of the analog equalizer based on level error values ($e_H$) stored in the first accumulator, and calculating a second coefficient for controlling a gain of the variable gain amplifier based on level error values ($e_L$) stored in the second accumulator.

The adaptive digital controller may further include a coefficient reset unit for resetting the first and second coefficients to be initialized at stable values. The scheduler may also have operation modes of a simultaneous mode and a separate mode. In addition, the scheduler in the simultaneous mode may control the level error values to be simultaneously input to the first and second accumulators from the level error detector regardless of the frequency components. Further, the scheduler in the separate mode may control the level error values to be input to the first and second accumulators from the level error detector with respect to any one of the frequency components, and separates the inputs of the level error values according to the frequency components so that the level error values are input in the first and second accumulators from the level error detector with respect to another frequency component.

The high-speed mixed analog/digital PRML data detection and clock recovery apparatus may further include a clock recovery circuit inputting the DC offset removal signal output from the DC offset remover, detecting a frequency error and a phase error, and correcting the detected frequency and phase errors to generate a system clock. In addition, the clock recovery circuit may include a frequency and phase error detector detecting the frequency and phase errors of the DC offset removal signal, and generating and outputting a frequency error signal and a phase error signal, a charge pump for selectively outputting any of a first pump signal and a second pump signal in response to any of the input frequency error signal and phase error signal, an analog loop filter for outputting a filter signal in response to any of the first and second pump signals, and a voltage-controlled oscillator for generating the system clock of a predetermined frequency, of which frequency error and phase error are corrected, in response to the filter signal.

To achieve the above and/or other aspects and advantages, embodiments of the present invention include a reproducing and/or recording apparatus, including an optical pickup for reading from and/or recording to a medium, and a high-speed mixed analog/digital PRML data detection and clock recovery apparatus according to embodiments of the present invention.

To achieve the above and/or other aspects and advantages, embodiments of the present invention include a high-speed mixed analog/digital PRML data detection and clock recovery method, including amplifying a gain of an input analog RF signal, analog equalizing the amplified analog RF signal, sampling and converting into a digital RF signal the equalized analog RF signal, removing DC offset components out of the digital RF signal and outputting a DC offset removal signal, detecting from the DC offset removal signal a determination level of the DC offset removal signal to have any one value of reference levels required by a desired channel characteristics model, and calculating level error values being a difference between the determination level and an actual level of the DC offset removal signal, decoding the DC offset removal signal and recovering data, and adaptive digital controlling, including separately storing the level error values according to predetermined frequencies, calculating predetermined coefficient values for each frequency component based on the level error values, and D/A-converting and applying the calculated predetermined coefficient values to the respective amplifying and equalizing.

To achieve the above and/or other aspects and advantages, embodiments of the present invention include a reproducing and/or recording method, including reading from and/or recording to a medium, and high-speed mixed analog/digital PRML data detecting and clock recovering according to embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
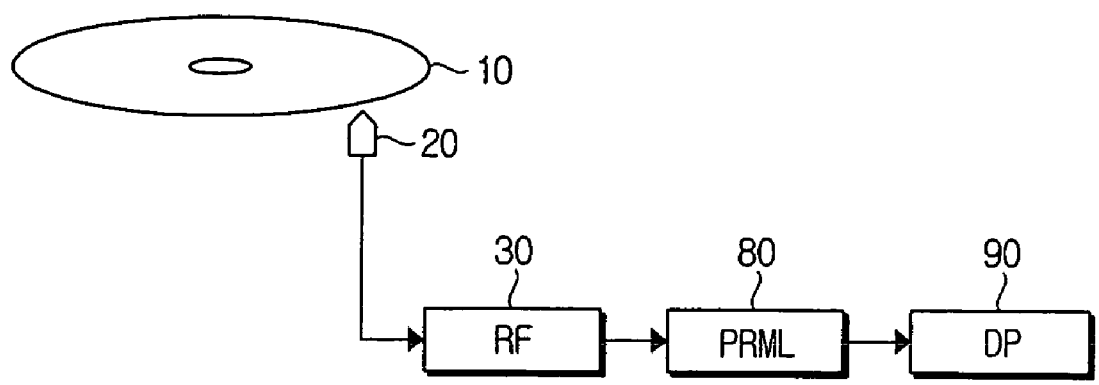
FIG. 1 is a block diagram illustrating a general optical disc system.
Figure 2:
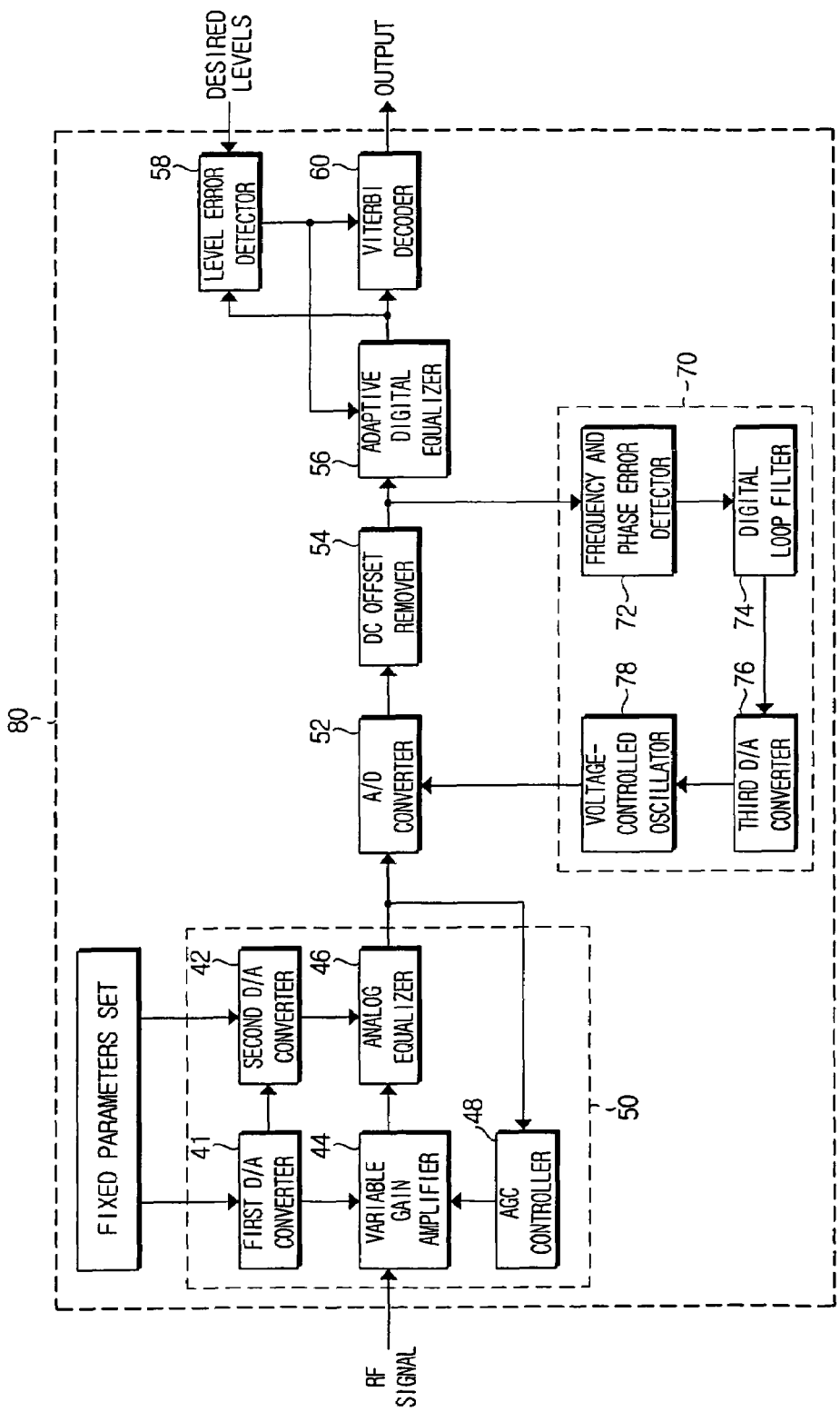
FIG. 2 is a block diagram illustrating in detail a PRML data detection apparatus of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
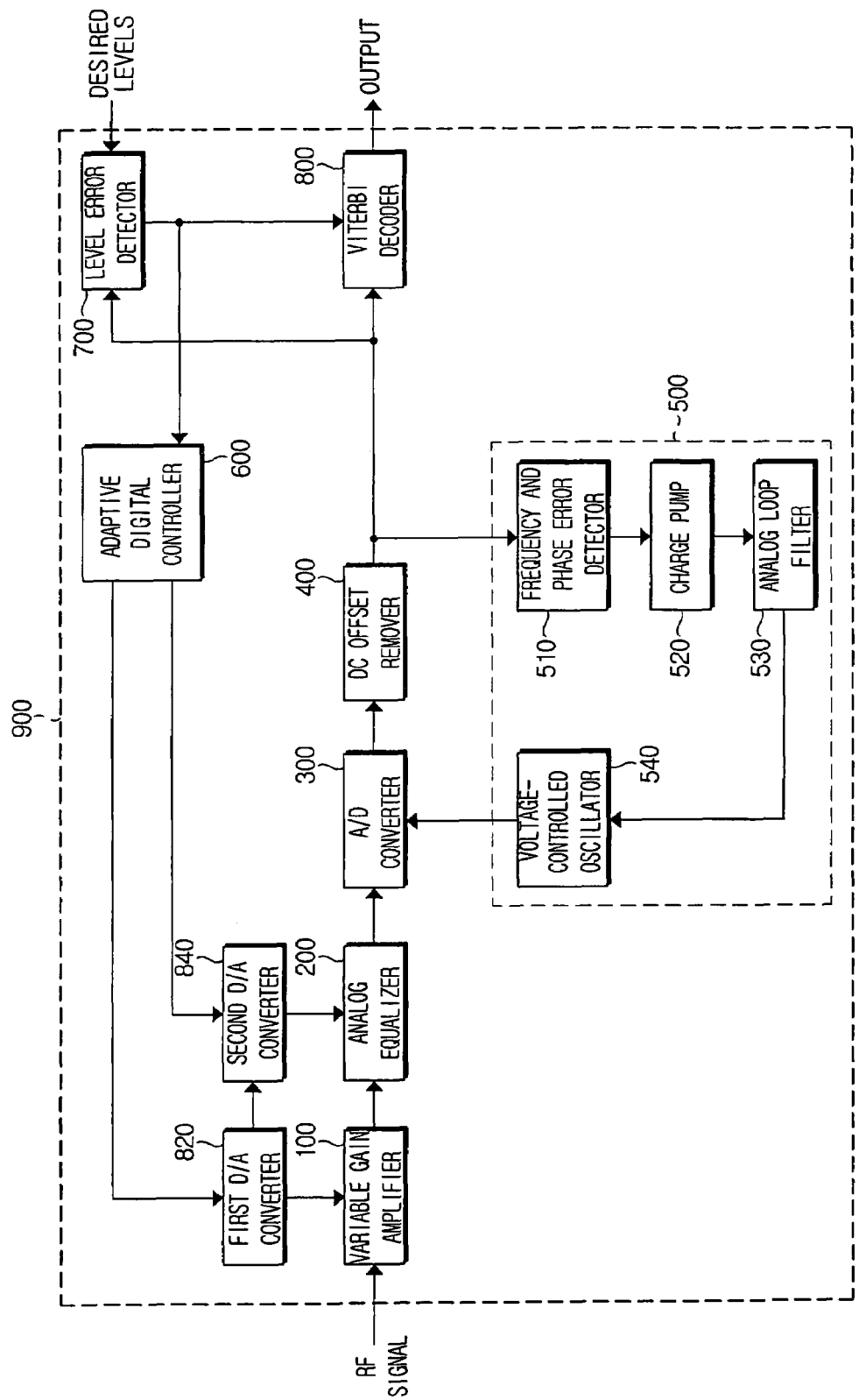
FIG. 3 is a block diagram illustrating a high-speed mixed analog/digital PRML data detection and clock recovery apparatus for data storage, according to an embodiment of the present invention.

FIG. 3 is a block diagram of a high-speed mixed analog/digital PRML data detection and clock recovery apparatus 900 for data storage, according to an embodiment of the present invention.

In FIG. 3, the high-speed mixed analog/digital PRML data detection and clock recovery apparatus 900 includes a plurality of D/A converters 820 and 840, a variable gain amplifier 100, an analog equalizer 200, an A/D converter 300, a DC offset remover 400, a clock recovery circuit 500, an adaptive digital controller 600, a level error detector 700, and a Viterbi decoder 800.

The A/D converter 300 converts an input RF signal, which is equalized in the analog equalizer 200, into a digital signal and inputs the converted signal to the DC offset remover 400. The DC offset remover 400 removes a DC offset component of the equalized RF signal for an input to the clock recovery circuit 500, the level error detector 700, and the Viterbi decoder 800.

The adaptive digital controller 600 controls the low-frequency gain of the variable gain amplifier (VGA) 100 and the high-frequency boosting gain of the analog equalizer 200 in order to equalize actual channel data to a desired target channel model.

The analog equalizer 200 equalizes the input RF signal into an output signal having a signal level required by the Viterbi decoder 800.

Figure 4:
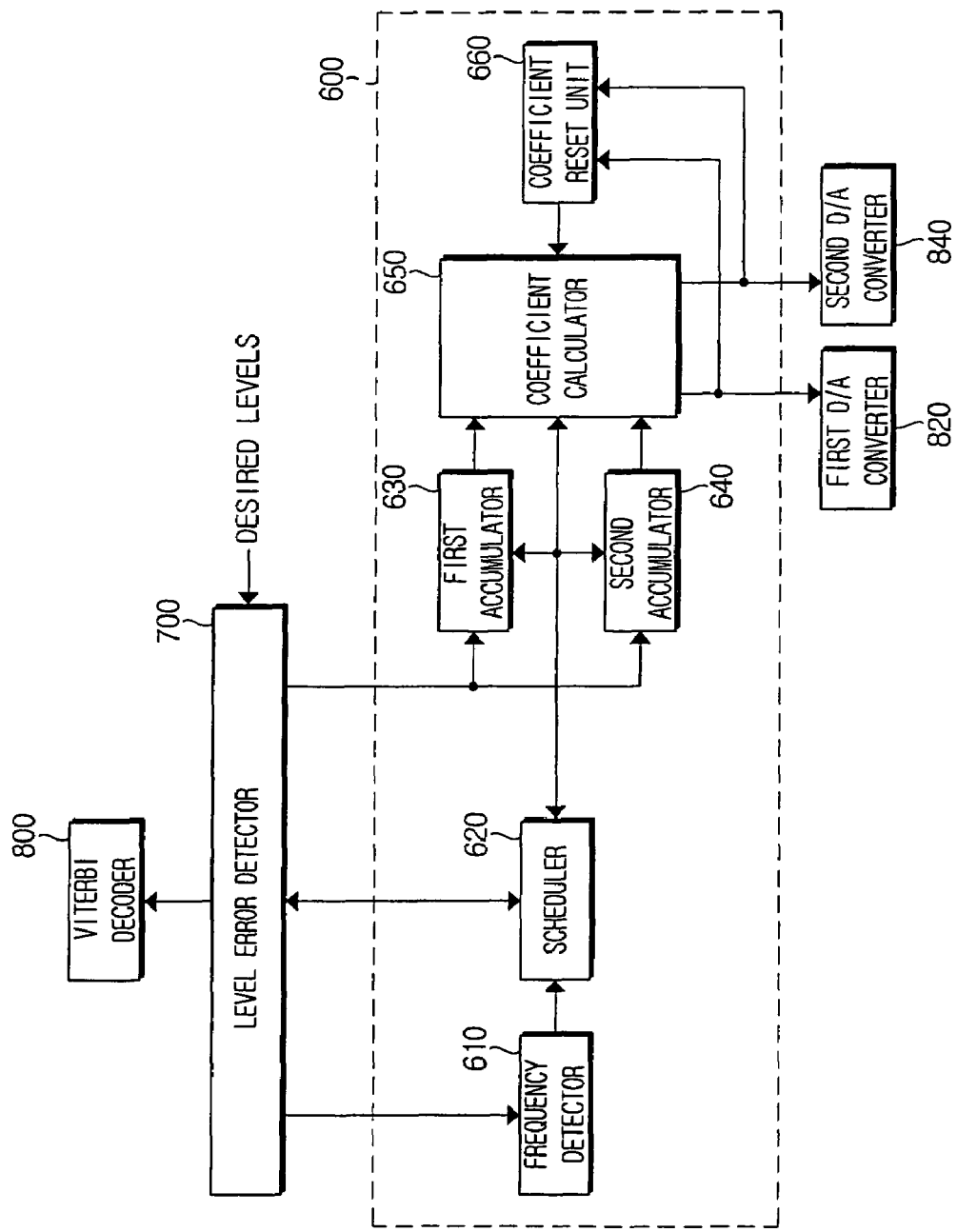
FIG. 4 is a block diagram illustrating in detail an adaptive digital controller for the high-speed mixed analog/digital PRML data detection and clock recovery apparatus of FIG. 3.

FIG. 4 is a view for illustrating an adaptive digital controller. In FIG. 4, the adaptive digital controller 600 includes a frequency detector 610, a scheduler 620, a plurality of accumulators 630 and 640, a coefficient calculator 650, and a coefficient reset unit 660.

The scheduler 620 calculates error signals from low-frequency and high-frequency components to control the gains of the analog equalizer 200 and variable gain amplifier 100 at the same time, or separately.

The clock recovery circuit 500 includes a frequency and phase error detector 510, a charge pump 520, an analog loop filter 530, and a voltage-controlled oscillator (VCO) 540. The clock recovery circuit 500 detects the frequency error and phase error of an input RF signal from the DC offset remover 400, and compensates the RF signal to the extent of errors.

The frequency and phase error detector 510 detects the frequency error and phase error of a DC offset removal signal, and generates and outputs a frequency error signal and a phase error signal. The charge pump 520 responds to either an input frequency error or an input phase error signal to selectively output either a first pump signal or a second pump signal. The analog loop filter 530 responds to either the first pump signal or the second pump signal to output a filtering signal. The voltage-controlled oscillator 540 responds to the filtering signal to generate a system clock having a certain frequency of which frequency error and phase error are corrected for input to the A/D converter 300.

The adaptive digital controller 600 converts an input signal (DVD RF signal) with the characteristics of FIG. 5 into an RF signal in an optical channel model PR (a, b, b, a), being a form required by the Viterbi decoder 800 of FIG. 6, and converts the input RF signal into a digital signal with low error rate, which will be described in detail as below.

Figure 5:
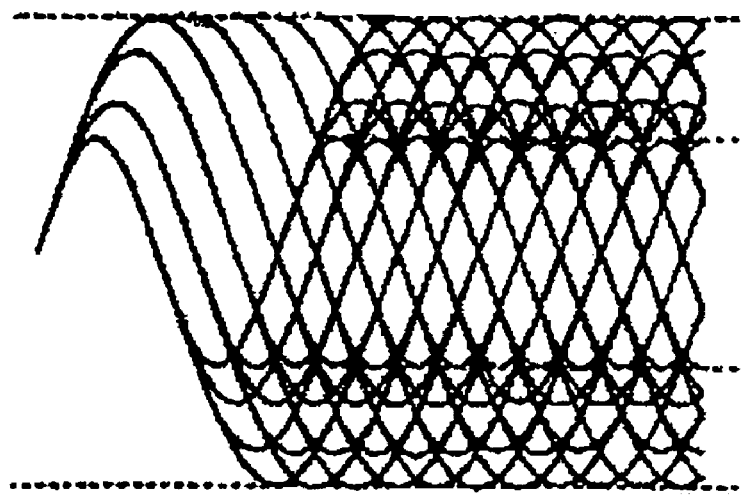
FIG. 5 is an eye diagram of a DVD RF signal.

The waveform of FIG. 5 depicts a signal read by a pickup of a DVD player and input to the adaptive digital controller 600. As shown in FIG. 5, an input signal has a different signal level depending on its value, and the signal level is determined by the physical properties of a corresponding disc.

Figure 6:
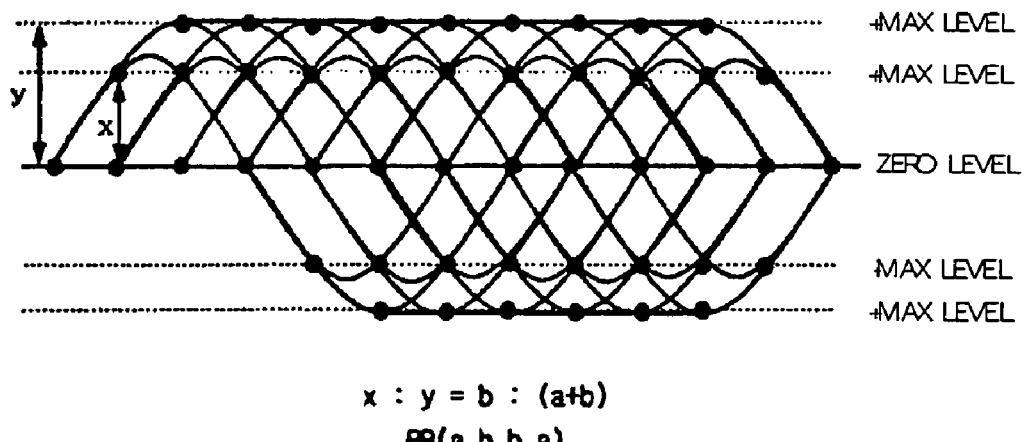
FIG. 6 is an eye diagram of an RF signal in an optical channel model PR (a, b, b, a)

FIG. 6 depicts the characteristics of a signal required by the Viterbi decoder 800. The level of a signal that the Viterbi decoder 800 requires is mathematically modeled based on the characteristics, and FIG. 6 is a view of a reference level based on the optical channel model PR (a, b, b, a). The channel model PR (a, b, b, a) can be expressed in Equation 1 as below:

$$F(z)=a+bz+bz^2+az^3, \quad \text{Equation 1}$$

In Equation 1, a and b are constants.

In FIG. 6, the level of a signal that the Viterbi decoder 800 requires consists of five reference levels marked +MAX, +MID, ZERO, −MID, −MAX. If the MID and MAX levels have the magnitudes of x and y, there exists a relationship of x:y=b:(a+b).

Figure 7:
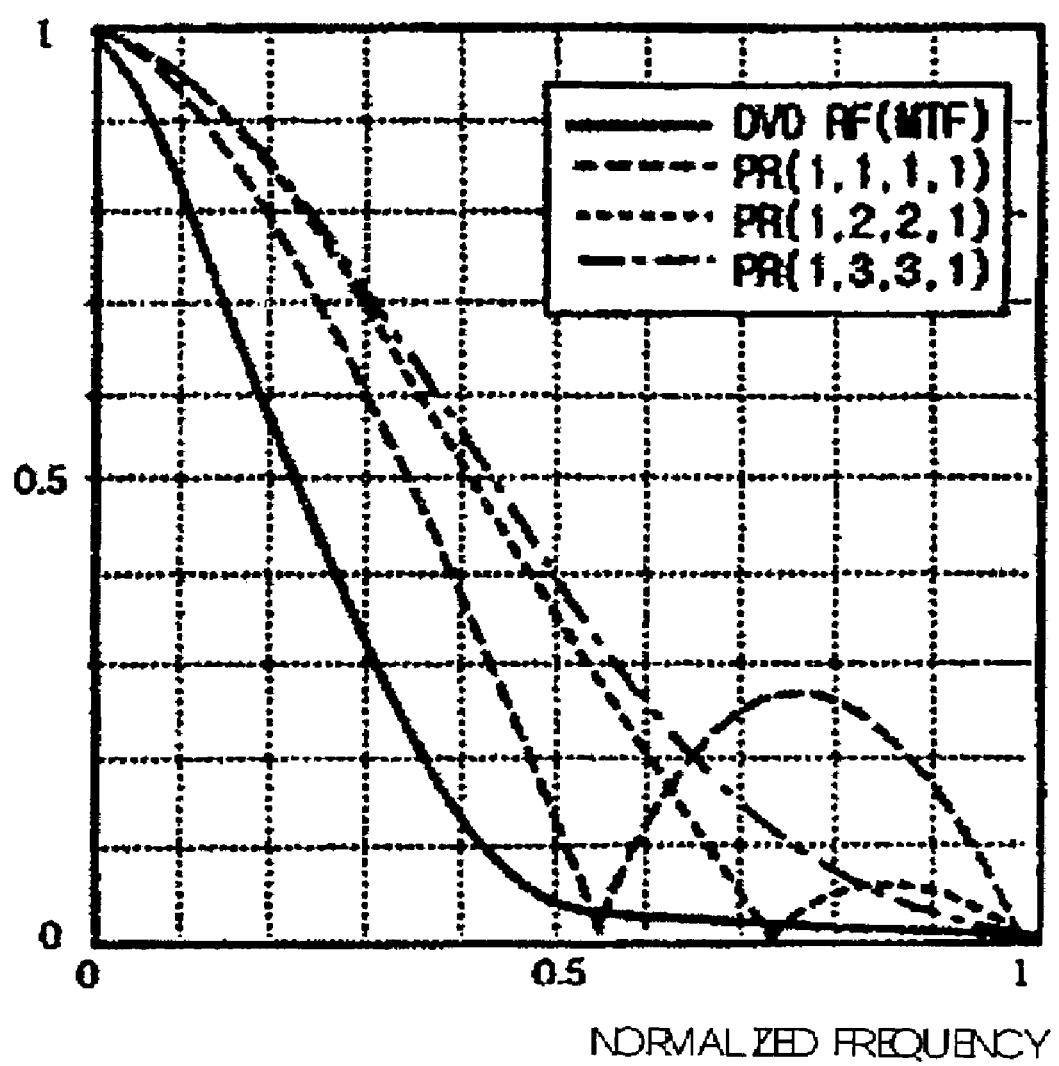
FIG. 7 is a graph for illustrating, in a normalized frequency domain, characteristics of each of the signals shown in FIG. 5 and FIG. 6.

FIG. 7 is a graph for comparing the characteristics of an input DVD RF signal to those of an RF signal in the channel model PR (a, b, b, a) in the frequency domain. As illustrated in FIG. 7, the adaptive digital controller 600 controls the gains of the variable gain amplifier 100 and the analog equalizer 200 so that the characteristics of an RF signal (solid line) can be changed into those of an RF signal in the channel model PR (a, b, b, a) (dotted lines). Such a channel model PR (a, b, b, a) is pre-established by a user according to the form the user wishes.

The level error detector 700 detects to which of the five signal levels +MAX, +MID, ZERO, −MID, and −MAX the level of an input signal from the DC offset remover 400 corresponds, and supplies information of the detected level to the frequency detector 610.

Figure 8:
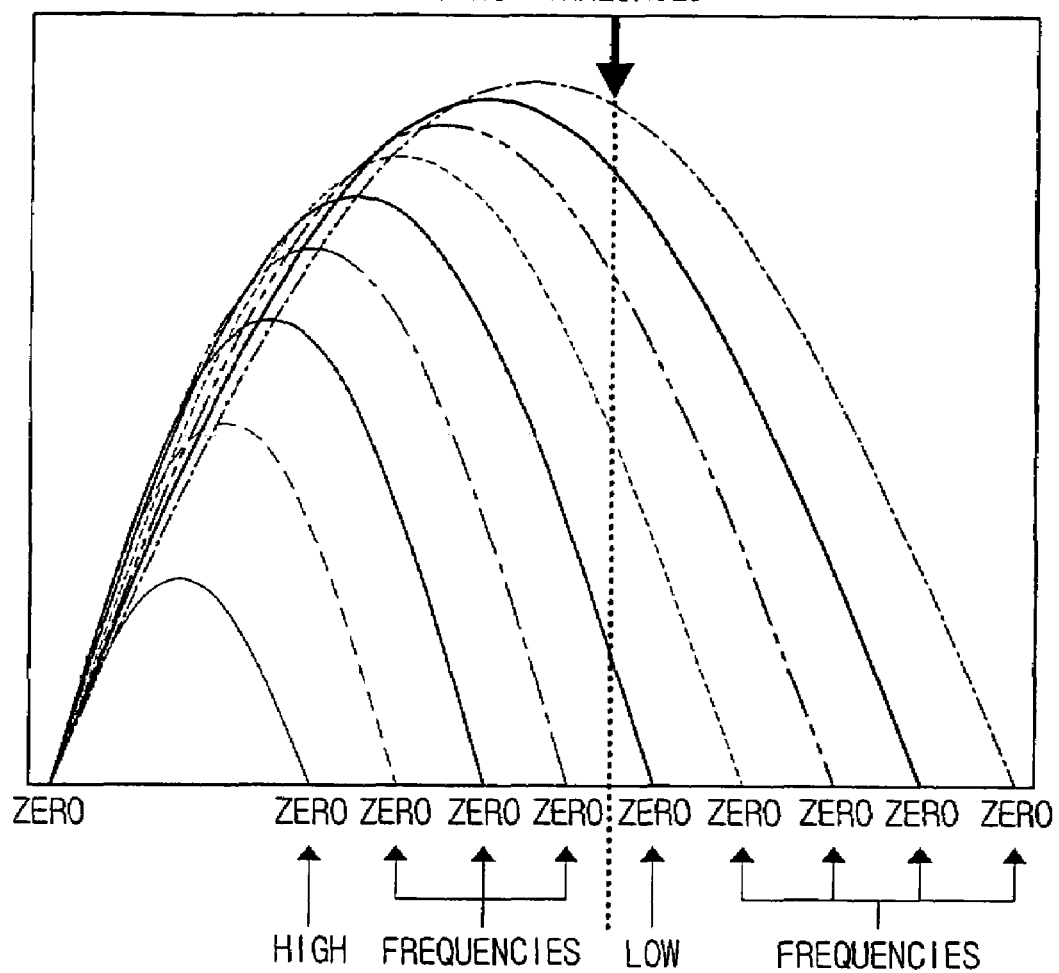
FIG. 8 is a view for explaining a frequency component detection method using a zero-crossing frequency detection method in a frequency detector, as shown in FIG. 4 for example.

The frequency detector 610 uses a zero-crossing frequency detection method to determine whether an input signal has a high-frequency signal or a low-frequency signal. FIG. 8 is a view explaining how the frequency detector 610 detects frequency components by using the zero-crossing frequency detection method.

In FIG. 8, the frequency detector 610 compares a frequency at a zero-crossing point (hereinafter, referred to as 'zero-point frequency') to a predetermined threshold frequency, at a point where an input signal varies from a positive level (+ level) to a negative level (− level). The predetermined threshold frequency can be changed by user's manipulations.

If a zero-point frequency of an input signal is determined to be higher than a predetermined threshold frequency as, the input signal is determined to be a high-frequency signal. If the zero-point frequency of the input signal is lower than the predetermined threshold frequency, the input signal is determined to be a low-frequency signal. Information of the frequency determination is input to the scheduler 620.

The level error detector 700 calculates a level error of every data based on a difference between the level of a signal in the model PR (a, b, b, a) the user wants and the level of an actual input signal from the DC offset remover 400.

FIGS. 9A-9D are views explaining how the level error detector 700 calculates the level error. In FIG. 9, the level error detector 700 subtracts an actual signal level from a signal level of a desired channel model to calculate an error signal. In FIGS. 9A-9D, $u_i$ denotes a signal level a user wishes, and $x_i$ denotes the level of a signal input from the DC offset remover 400.

Figure 9A:
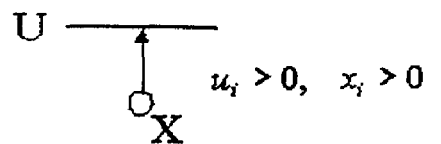
FIG. 9A to FIG. 9D are views explaining a level error calculation method for the level error detector shown in FIG. 3.

FIG. 9A is an equation for calculating a level error $e_i$ when $u_i>0$ and $x_i>0$, in here, $$e_i=|u_i|-|x_i|=u_i-x_i=(u_i-x_i)\cdot\text{sign}(x_i).$$

Figure 9B:
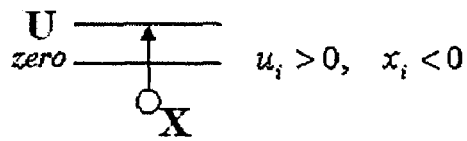

FIG. 9B is an equation for calculating a level error $e_i$ when $u_i>0$ and $x_i<0$, in here, $$e_i=-(|u_i|+|x_i|)=-(u_i+(-x_i))=-u_i+x_i=(u_i-x_i)\cdot\text{sign}(x_i).$$

Figure 9C:
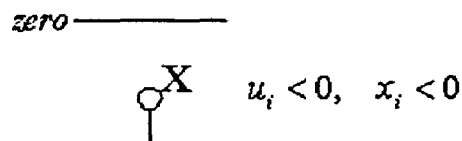

FIG. 9C is an equation for calculating a level error $e_i$ when $u_i<0$ and $x_i<0$, in here, $$e_i=|u_i|-|x_i|=(-u_i)-(-x_i)=-(u_i-x_i)=(u_i-x_i)\cdot\text{sign}(x_i).$$

Figure 9D:
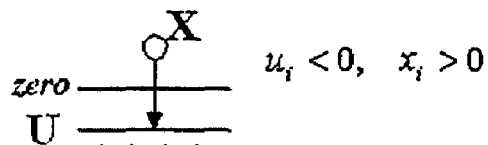

FIG. 9D is an equation for calculating a level error $e_i$ when $u_i<0$ and $x_i>0$, in here, $$e_i=-(|u_i|+|x_i|)=-((-u_i)+x_i)=u_i-x_i=(u_i-x_i)\cdot\text{sign}(x_i).$$

In the above manner, the level error $e_i=(u_i-x_i)\cdot\text{sign}(x_i)$ can be calculated, and information on the direction and magnitude of an error correction value can be obtained from the calculated level error. Level error values calculated in the level error detector 700, as above, are sent to the Viterbi decoder 800 and accumulators 630 and 640. The level error values input to the accumulators 630 and 640, respectively, under the control of the scheduler 620.

The scheduler 620 operates in two modes, that is, in a simultaneous mode and a separate mode. Description will be made as below on the operations of the scheduler 620 in the simultaneous mode.

If an input signal is determined to be a high-frequency signal, according to the frequency information determined by the frequency detector 610, the scheduler 620 stores in the first accumulator 630 a value of the level error $e_H$ calculated in the level error detector 700. If the input signal is determined to be a low-frequency signal, the scheduler 620 stores in the second accumulator 640 a value of the level error $e_L$ calculated in the level error detector 700.

The scheduler 620 counts the number of level error values accumulated in the accumulators 630 and 640, and stores the level error values in the accumulators 630 and 640 till the number of accumulated level error values reaches a predetermined number N.

If the number of accumulated level error values reaches the predetermined number N, the scheduler 620 controls the accumulators 630 and 640 to input the stored N level error values $e_i$ to the coefficient calculator 650.

The scheduler 620 resets and disables the accumulators 630 and 640 till a new accumulation cycle starts so as not to store the level error values in the accumulators 630 and 640 any more.

In the separate mode, the scheduler 620 first stores in the first accumulator 630 only the level error values $e_H$ corresponding to high-frequency signals, and then inputs the stored error values to the coefficient calculator 650. Thus, the coefficient values calculated in the coefficient calculator 650 are input to the analog equalizer 200, and then the gain of the analog equalizer 200 is adjusted.

Thereafter, the scheduler 620 stores in the second accumulator 640 the level error values $e_L$ corresponding to low-frequency signals, and then inputs the stored error values to the coefficient calculator 650. Thus, the coefficient values calculated in the coefficient calculator 650 are input to the variable gain amplifier 100, and then the gain of the variable gain amplifier 100 is adjusted.

In the reverse manner to the above, the scheduler 620 can first deal with the level error values $e_L$ corresponding to low-frequency signals, and then deal with the level error values $e_H$ corresponding to high-frequency signals.

The level errors $e_i$ input from the first and second accumulators 630 and 640 are used when the coefficient calculator 650 calculates new coefficient values by the Least Mean Square (LMS) adaptive equalization algorithm expressed in Equation 2 as below:

Equation 2

$$C_{t+1} = C_t + \mu \cdot e = C_t + \mu \cdot \sum_{i=0}^{N}(\mu_i - x_i)\cdot\text{sign}(x_i) \qquad \text{Equation 2}$$

In Equation 2, $C_{t+1}$ denotes a new coefficient value for an adaptive digital controller, $C_t$ denotes a current coefficient value for the adaptive digital controller, e denotes a level error value, and $\mu$ denotes a constant.

A very simple digital circuit can be used to perform the algorithm. Instead of selecting and multiplying an arbitrary $\mu$, $\mu=2^{-K}$ (K=integer) can be selected. Here, the multiplication can be replaced with K-bit conversion. Accordingly, only a converter is needed instead of a multiplier. Such an approach enables high-speed gains to be obtained.

Meanwhile, a coefficient value calculated from Equation 1 is input to the coefficient reset unit 660, and at the same time, input to the variable gain amplifier 100 and the analog equalizer 200, respectively, via a first D/A converter 820 and a second D/A converter 840.

The coefficient reset unit 660 checks all the calculated coefficients, and, if the coefficients exceed an allowed range, the coefficient reset unit 660 determines that the adaptive digital controller 600 diverges rather than converging. Thus, the coefficient reset unit 660 resets the adaptive digital controller 600, to be initialized with stable coefficient values, so that the entire system overcomes its unstableness.

Since the coefficient values calculated in the coefficient calculator 650 are digital values, the digital values are converted into analog forms via the first and second D/A converters 820 and 840 and then input to the variable gain amplifier 100 and the analog equalizer 200, respectively.

The coefficient values converted into the analog form are input in the form of voltage or current so as to adjust the gains of the variable gain amplifier 100 and the analog equalizer 200. If a coefficient value is a positive number, a large voltage or current occurs, and, if a coefficient value is small or a negative number, a small voltage or current occurs.

In the manner as above, the gain control of the variable gain amplifier 100 and analog equalizer 200 enables actual channel data to be equalized in a desired target channel model. That is, the variable gain amplifier 100 and analog equalizer 200 are adaptively controlled by the adaptive digital controller 600 to minimize error values accumulated from the high-frequency and low-frequency components.

Figure 10:
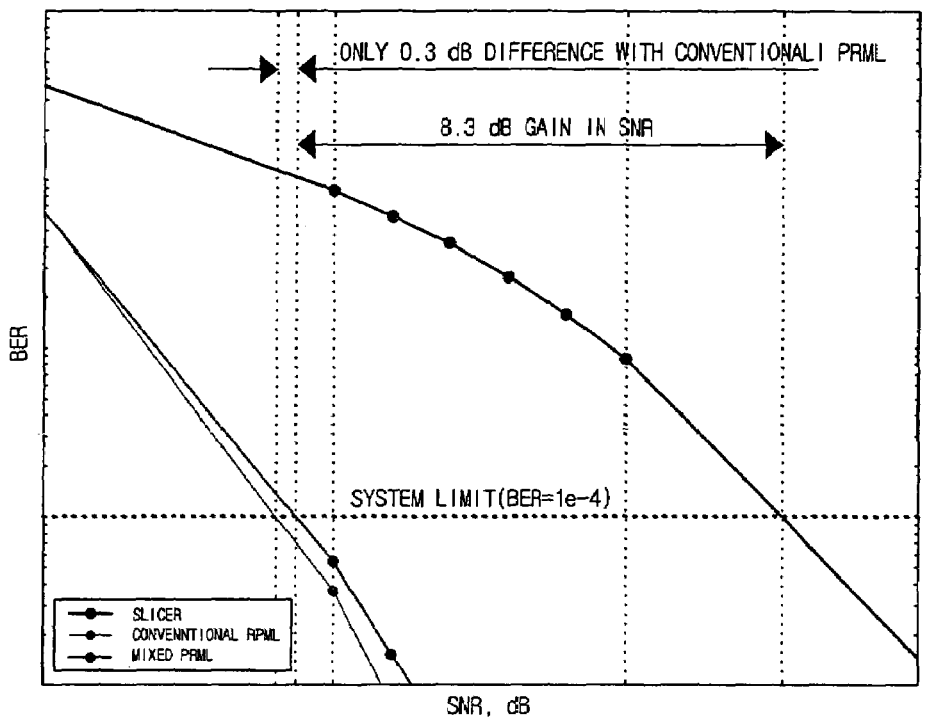
FIG. 10 is a graph showing bit error rate changes with respect to signal-to-noise ratio changes of conventional PRML data detection apparatuses and a slicer and high-speed mixed digital/analog PRML data detection and clock recovery apparatus and method for data storage, according to an embodiment of the present invention.

FIG. 10 is a graph of bit error rate changes with respect to signal-to-noise ratio changes of the conventional PRML data detection apparatus and method and slicer and the high-speed mixed digital/analog PRML data detection apparatus for data storage, according to an embodiment of the present invention. In FIG. 10, at the bit error rate (BER) limit value of $10^{-4}$ of the system, there is a difference of 0.3 dB between the conventional PRML data detection apparatus and the high-speed mixed analog/digital PRML data detection and clock recovery apparatus and method for data storage according to an embodiment of the present invention, which implies that there is no large difference in the BER changes with respect to the signal-to-noise ratio (SNR) changes between the conventional PRML data detection apparatus and the high-speed mixed analog/digital PRML data detection and clock recovery apparatus and method for data storage according to an embodiment of the present invention.

If the signal-to-noise ratio (SNR) changes from 10 dB to 25 dB, FIG. 10 shows the high-speed mixed analog/digital PRML data detection and clock recovery apparatus for data storage according to an embodiment of the present invention has a gain margin of 8.3 dB compared to the conventional slicer.

Figure 11:
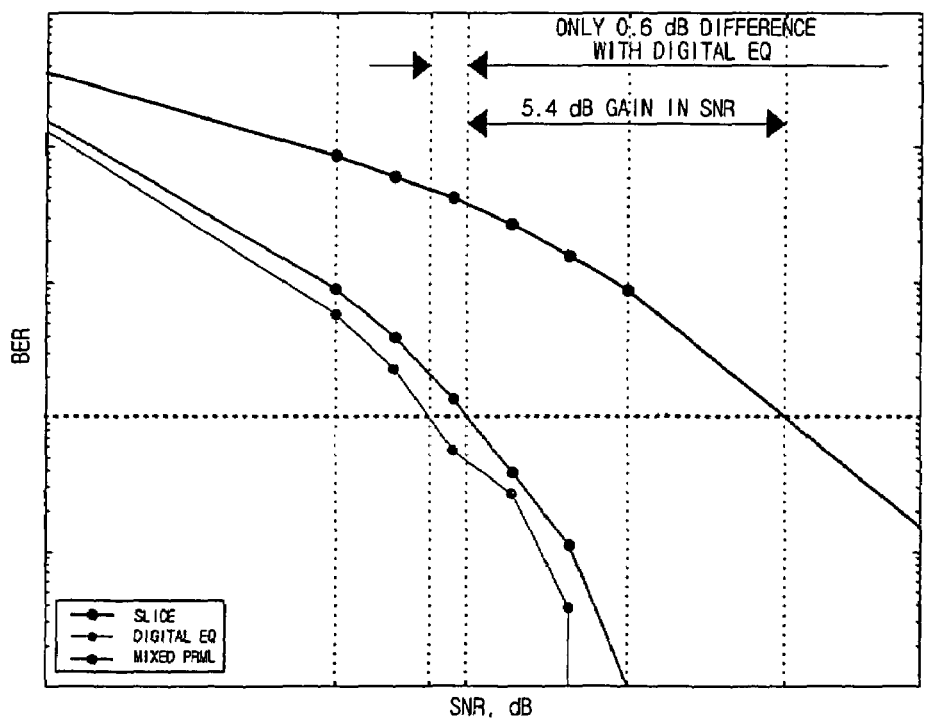
FIG. 11 is a graph illustrating bit error rate changes with signal-to-noise ratio changes of a high-speed mixed digital/analog PRML data detection and clock recovery apparatus and method for data storage, digital equalizer, and slicer, according to an embodiment of the present invention.

FIG. 11 is a graph of the bit error rate (BER) changes with respect to the signal-to-noise ratio (SNR) changes of a digital equalizer, slicer, and high-speed mixed digital/analog PRML data detection and clock recovery apparatus and method for data storage according to an embodiment of the present invention. FIG. 11 illustrates a gain margin difference similar to FIG. 10.

Figure 12:
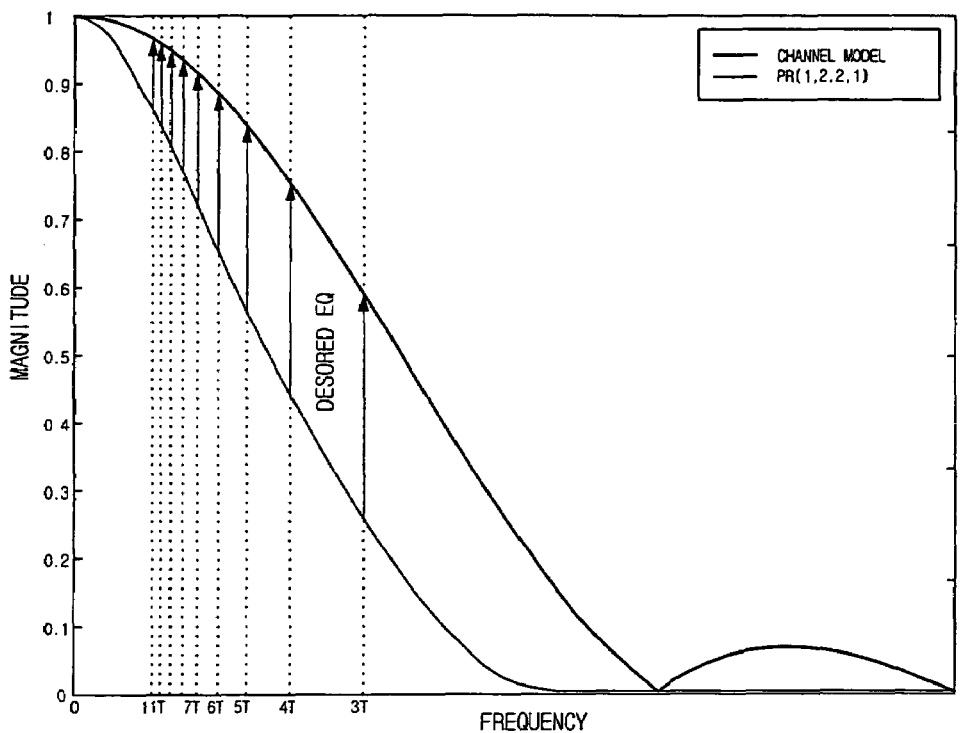
FIG. 12 is a graph illustrating a channel frequency response to a PR (1, 2, 2, 1) channel.
Figure 13:
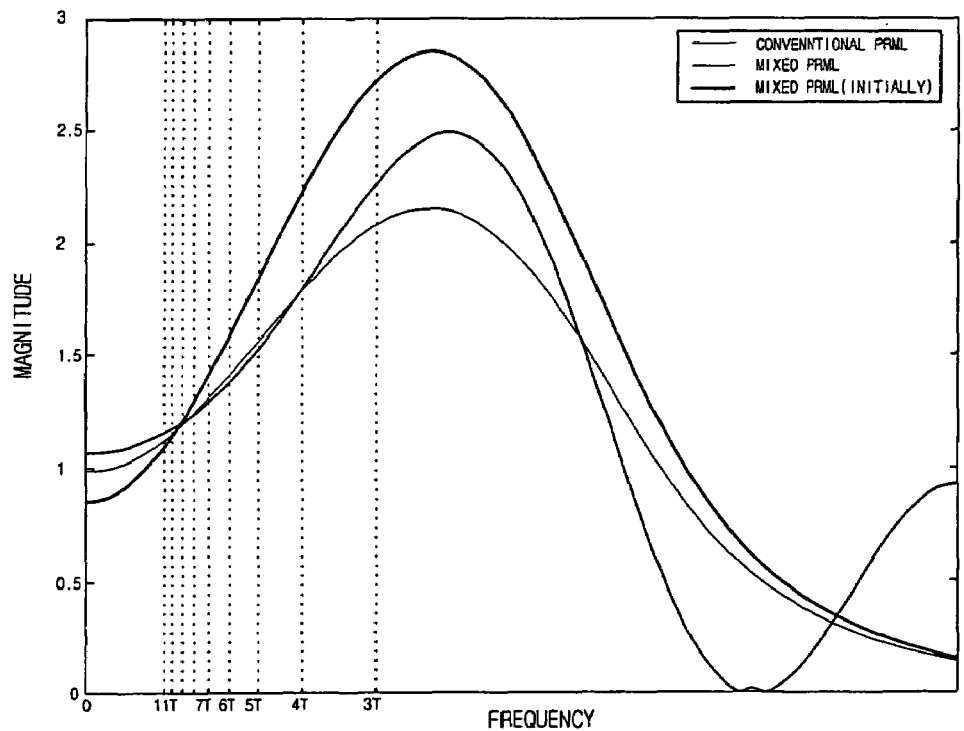
FIG. 13 is a graph illustrating frequency responses of an equalizer to a PR (1, 2, 2, 1)

FIG. 12 is a graph of a channel frequency response to a channel PR (1, 2, 2, 1), and FIG. 13 is a graph of equalizer frequency responses to the channel PR (1, 2, 2, 1).

Figure 14:
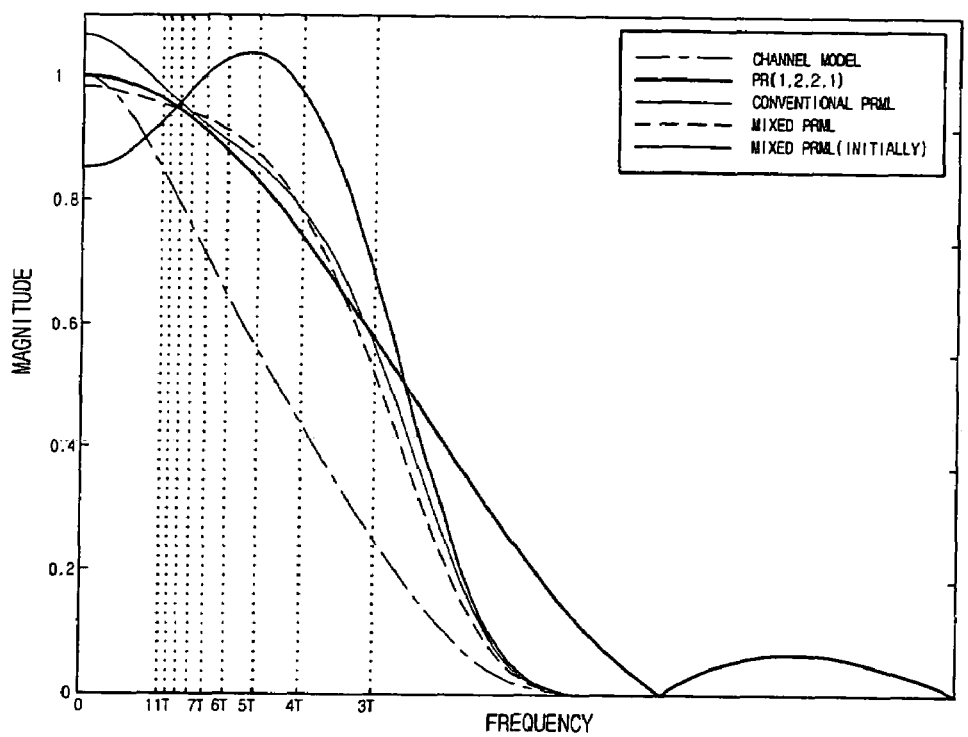
FIG. 14 is a graph illustrating an equalization channel gradually compensated to a desired target channel.

FIG. 14 is a graph of an equalization channel being gradually compensated to a desired target channel. FIG. 14 depicts that channels equalized to diverse channel models are gradually compensated to a desired target channel. FIG. 14 depicts that the conventional PRML data detection apparatus has nearly the same characteristics as the high-speed mixed digital/analog PRML data detection and clock recovery apparatus and method for data storage according to an embodiment of the present invention.

Figure 15:
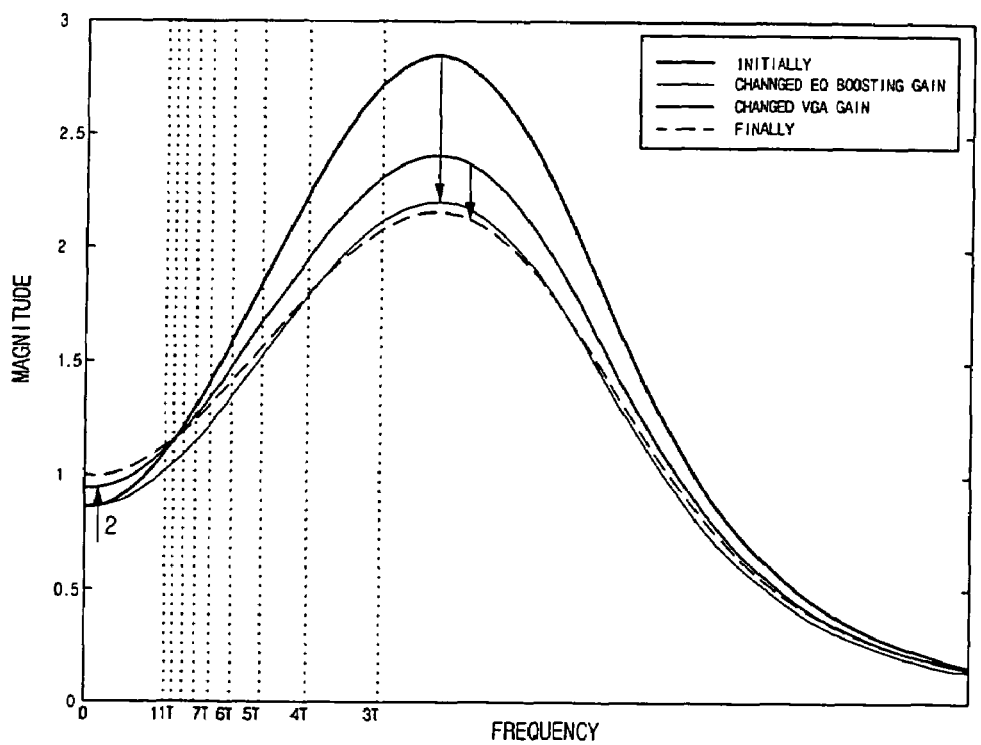
FIG. 15 is a graph illustrating gradual compensation steps of a boosting gain of an analog equalizer.
Figure 16:
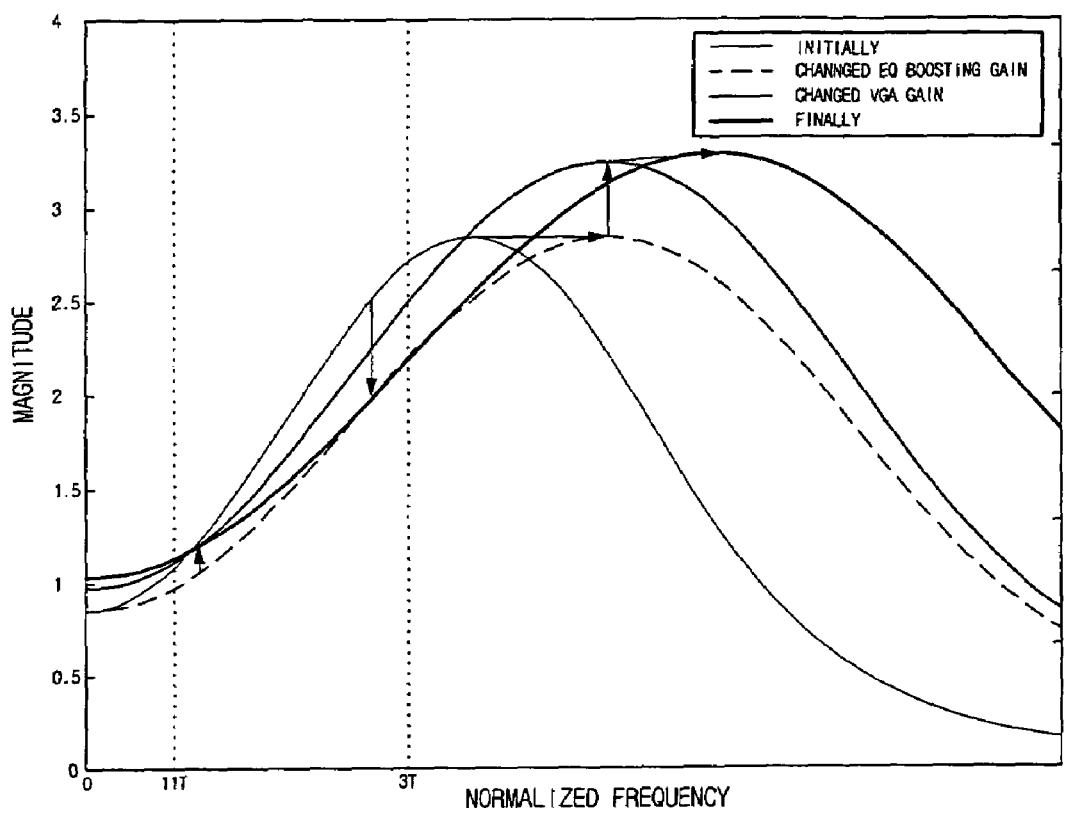
FIG. 16 is a graph illustrating gradual compensation steps of a cutoff frequency gain of the analog equalizer.

FIG. 15 is a graph of gradual steps for compensations of the analog equalizer for boosting gains, and FIG. 16 is a graph of gradual steps for compensations of the analog equalizer for cutoff frequency gains. FIG. 15 and FIG. 16 show that the high-speed mixed digital/analog PRML data detection and clock recovery apparatus for data storage, which controls only the boosting gains, has the effect to satisfactorily compensate the equalizer as if controlling the cutoff frequency.

The following Table 1 shows comparisons of the individual analog devices of the conventional PRML data detection apparatus and the high-speed mixed digital/analog PRML data detection and clock recovery apparatus and method for data storage, according to an embodiment of the present invention.

TABLE 1

| | Current, mA | | Size, um | |
| --- | --- | --- | --- | --- |
| | Conventional PRML | Present PRML | Conventional PRML | Present PRML |
| Variable gain amplifier (VGA) | 6 | 6 | 300 * 300 | 300 * 300 |
| Analog AGC | 3 | — | 500 * 300 | — |
| Analog equalizer | 33 | 33 | 380 * 890 | 380 * 890 |
| Voltage-controlled oscillator (VCO) | — | 2 | — | 85 * 270 |
| Charge pump | — | 5 | — | 210 * 835 |
| Voltage-controlled oscillator + D/A converter | 25 | — | 1700 * 640 | — |
| Analog loop filter | External Passive Device | | | |
| TOTAL | 67 | 46 | 1666200 | 626500 |
| IMPROVEMENT | 31% | | 38% | |

As shown in Table 1, when compared to the conventional PRML data (or bit) detection apparatus, the high-speed mixed digital/analog PRML data (or bit) detection apparatus and method of the present invention reduces current consumption by 31% and requires 38% less chip area.

The following Table 2 shows the comparisons of the individual digital devices of the conventional data detection apparatus and the high-speed mixed digital/analog PRML data detection apparatus and method according to an embodiment of the present invention.

TABLE 2

| | Gate count | | Operational frequency, MHz | |
| --- | --- | --- | --- | --- |
| | Conventional PRML | Present PRML | Conventional PRML | Present PRML |
| Digital equalizer | 60657 | — | 420 | 700 |
| Digital loop filter | 6707 | — | | |
| Adaptive digital controller | — | 10360 | | |
| Other digital devices | 105560 | 105560 | | |
| TOTAL | 172924 | 115920 | | |
| IMPROVEMENT | 33% | | 67% | |

As shown in Table 2, the high-speed mixed digital/analog PRML data detection and clock recovery apparatus and method for data storage according to an embodiment of the present invention is enhanced by 33%, in gate counts, in relation to the digital devices, and by 67% for the maximum operational speed. That is, the digital devices and method of the present invention only have about 10K gates and can perform at about 700 MHz.

As described above, the high-speed mixed analog/digital PRML data detection apparatus and method for data storage according to an embodiment of the present invention lessens the required chip size and power consumption, and improves the operational speed, compared to the conventional PRML data detection apparatus.

Embodiments of the present invention having the structure and operations as above can greatly increase the signal-processing speed of a data detection system, and reduce the circuit complexity and costs, so as to improve reliability.

Embodiments of the present invention eliminate digital FIR filters requiring a series of multipliers and adders, so as to permit smaller chip sizes and lower power consumption, with higher operational speeds.

Furthermore, embodiments of the present invention have advantages of potentially being applicable to diverse applications requiring data storage, communications, adaptive equalization and detection for channel data, and so on.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A high-speed mixed analog/digital PRML data detection and clock recovery apparatus, comprising:
    a variable gain amplifier for amplifying a gain of an input analog RF signal;
    an analog equalizer for equalizing the amplified analog RF signal;
    an analog-to-digital (A/D) converter for sampling and converting into a digital RF signal the equalized analog RF signal;
    a DC offset remover for removing DC offset components out of the digital RF signal and outputting a DC offset removal signal;
    a level error detector for detecting from the DC offset removal signal a determination level of the DC offset removal signal to have any one value of reference levels required by a desired channel characteristics model, and calculating level error values being a difference between the determination level and an actual level of the DC offset removal signal;
    a Viterbi decoder for decoding the DC offset removal signal and recovering data; and
    an adaptive digital controller separately storing the level error values according to predetermined frequencies, calculating predetermined coefficient values for each frequency component based on the level error values, and applying the calculated predetermined coefficient values to D/A converters applying the D/A converted calculated predetermined coefficient values to the variable gain amplifier and the analog equalizer for the respective amplifying and equalizing,
    wherein the adaptive digital controller further comprises:
    a frequency detector for inputting a determination signal of the level error detector, from which the determination level is detected to have the one value of the reference levels, comparing a frequency of the determination signal to a predetermined threshold frequency, and calculating frequency components of the determination signal;
    a scheduler for storing the level error values in a first accumulator when the frequency components of the determination signal are high frequencies, and storing the level error values in a second accumulator when the frequency components of the determination signal are low frequencies, based on information on the calculated frequency components of the determination signal; and
    a coefficient calculator for calculating a first coefficient for controlling a gain of the analog equalizer based on level error values ($e_H$) stored in the first accumulator, and calculating a second coefficient for controlling a gain of the variable gain amplifier based on level error values ($e_L$) stored in the second accumulator.

2. The high-speed mixed analog/digital PRML data detection and clock recovery apparatus of claim 1, wherein a frequency component of the predetermined coefficient values applied to the variable gain amplifier is a low-frequency.

3. The high-speed mixed analog/digital PRML data detection and clock recovery apparatus of claim 1, wherein a frequency component of the predetermined coefficient values applied to the analog equalizer is a high-frequency.

4. The high-speed mixed analog/digital PRML data detection and clock recovery apparatus of claim 1, wherein the adaptive digital controller further comprises a coefficient reset unit for resetting the first and second coefficients to be initialized at stable values.

5. The high-speed mixed analog/digital PRML data detection and clock recovery apparatus of claim 1, wherein the scheduler has operation modes of a simultaneous mode and a separate mode.

6. The high-speed mixed analog/digital PRML data detection and clock recovery apparatus of claim 5, wherein the scheduler in the simultaneous mode controls the level error values to be simultaneously input to the first and second accumulators from the level error detector regardless of the frequency components.

7. The high-speed mixed analog/digital PRML data detection and clock recovery apparatus of claim 5, wherein the scheduler in the separate mode controls the level error values to be input to the first and second accumulators from the level error detector with respect to any one of the frequency components, and separates the inputs of the level error values according to the frequency components so that the level error values are input in the first and second accumulators from the level error detector with respect to another frequency component.

8. The high-speed mixed analog/digital PRML data detection and clock recovery apparatus of claim 1, further comprising a clock recovery circuit inputting the DC offset removal signal output from the DC offset remover, detecting a frequency error and a phase error, and correcting the detected frequency and phase errors to generate a system clock.

9. The high-speed mixed analog/digital PRML data detection and clock recovery apparatus of claim 8, wherein the clock recovery circuit comprises:
    a frequency and phase error detector detecting the frequency and phase errors of the DC offset removal signal, and generating and outputting a frequency error signal and a phase error signal;
    a charge pump for selectively outputting any of a first pump signal and a second pump signal in response to any of the input frequency error signal and phase error signal;
    an analog loop filter for outputting a filter signal in response to any of the first and second pump signals; and
    a voltage-controlled oscillator for generating the system clock of a predetermined frequency, of which frequency error and phase error are corrected, in response to the filter signal.

10. A reproducing and/or recording apparatus, comprising:
    an optical pickup for reading from and/or recording to a medium; and
    a high-speed mixed analog/digital PRML data detection and clock recovery apparatus of claim 9 for an input analog RF signal from the optical pickup.

11. A reproducing and/or recording apparatus, comprising:
an optical pickup for reading from and/or recording to a medium; and
a high-speed mixed analog/digital PRML data detection and clock recovery apparatus of claim 1 for an input analog RF signal from the optical pickup.

12. A high-speed mixed analog/digital PRML data detection and clock recovery method, comprising:
amplifying a gain of an input analog RF signal;
analog equalizing the amplified analog RF signal;
sampling and converting into a digital RF signal the equalized analog RF signal;
removing DC offset components out of the digital RF signal and outputting a DC offset removal signal;
detecting from the DC offset removal signal a determination level of the DC offset removal signal to have any one value of reference levels required by a desired channel characteristics model, and calculating level error values being a difference between the determination level and an actual level of the DC offset removal signal;
decoding the DC offset removal signal and recovering data; and
adaptive digital controlling, including separately storing the level error values according to predetermined frequencies, calculating predetermined coefficient values for each frequency component based on the level error values, and D/A-converting and applying the calculated predetermined coefficient values to the respective amplifying and equalizing,
wherein the adaptive digital controlling further comprises:
inputting a determination signal of the level error detector, from which the determination level is detected to have the one value of the reference levels, comparing a frequency of the determination signal to a predetermined threshold frequency, and calculating frequency components of the determination signal;
storing the level error values in a first accumulator when the frequency components of the determination signal are high frequencies, and storing the level error values in a second accumulator when the frequency components of the determination signal are low frequencies, based on information on the calculated frequency components of the determination signal; and
calculating a first coefficient for controlling a gain of the analog equalizing based on level error values ($e_H$) stored in the first accumulator, and calculating a second coefficient for controlling a gain of the variable gain amplifier based on level error values ($e_L$) stored in the second accumulator.

13. The method of claim 12, wherein a frequency component of the predetermined coefficient values applied to the variable gain amplifier is a low-frequency.

14. The method of claim 12, wherein a frequency component of the predetermined coefficient values applied to the analog equalizing is a high-frequency.

15. The method of claim 12, wherein the adaptive digital controlling further comprises resetting the first and second coefficients to be initialized at stable values.

16. The method of claim 12, wherein the method has operation modes of a simultaneous mode and a separate mode.

17. The method of claim 16, wherein, in the simultaneous mode, controlling the level error values to be simultaneously input to the first and second accumulators regardless of the frequency components.

18. The method of claim 16, further comprising controlling the level error values to be input to the first and second accumulators from the level error detector with respect to any one of the frequency components, and separating the inputs of the level error values according to the frequency components so that the level error values are input in the first and second accumulators from the level error detector with respect to another frequency component.

19. The method of claim 12, further comprising inputting the DC offset removal signal output from the DC offset remover to a clock recovery circuit for clock recovery, detecting a frequency error and a phase error, and correcting the detected frequency and phase errors to generate a system clock.

20. The method of claim 19, wherein the clock recovery comprises:
detecting the frequency and phase errors of the DC offset removal signal, and generating and outputting a frequency error signal and a phase error signal;
selectively outputting any of a first pump signal and a second pump signal in response to any of the input frequency error signal and phase error signal;
outputting a filter signal in response to any of the first and second pump signals; and
generating the system clock of a predetermined frequency, of which frequency error and phase error are corrected, in response to the filter signal.

21. A reproducing and/or recording method, comprising:
reading from and/or recording to a medium; and
high-speed mixed analog/digital PRML data detecting and clock recovering of claim 12 for an input analog RF signal from the optical pickup.

22. A reproducing and/or recording method, comprising:
reading from and/or recording to a medium; and
high-speed mixed analog/digital PRML data detecting and clock recovering of claim 20 for an input analog RF signal for the medium.

* * * * *